US011504828B1

United States Patent
Batdorf et al.

(10) Patent No.: US 11,504,828 B1
(45) Date of Patent: Nov. 22, 2022

(54) ADAPTER FOR INTRAOSSEOUS NEEDLE ASSEMBLY

(71) Applicant: THE SEABERG COMPANY, INC., Tualatin, OR (US)

(72) Inventors: Eric E. Batdorf, Oregon City, OR (US); Kyle Sims, Fayetteville, NC (US); Samuel Scheinberg, Gleneden Beach, OR (US)

(73) Assignee: THE SEABERG COMPANY, INC., Tualatin, OR (US)

( * ) Notice: Subject to any disclaimer, the term of this patent is extended or adjusted under 35 U.S.C. 154(b) by 0 days.

(21) Appl. No.: 17/855,654

(22) Filed: Jun. 30, 2022

(51) Int. Cl.
  *B25B 15/00* (2006.01)
  *F16D 1/10* (2006.01)

(52) U.S. Cl.
  CPC .............. *B25B 15/005* (2013.01); *F16D 1/10* (2013.01); *F16D 2001/102* (2013.01)

(58) Field of Classification Search
  CPC .... B25B 15/005; F16D 1/10; F16D 2001/102
  See application file for complete search history.

(56) References Cited

U.S. PATENT DOCUMENTS

| 3,554,306 | A * | 1/1971 | Wilburn | F16D 1/101 |
| | | | | 175/320 |
| 9,567,811 | B2 * | 2/2017 | Kenno | E21B 17/076 |
| 9,603,648 | B2 * | 3/2017 | Frock | A61B 17/7062 |
| 10,285,739 | B2 * | 5/2019 | Frock | A61B 17/8891 |
| 10,377,020 | B2 * | 8/2019 | Campbell | B25B 23/105 |
| 2014/0358186 | A1 * | 12/2014 | Frock | A61B 17/7062 |
| | | | | 606/86 A |
| 2021/0131497 | A1 * | 5/2021 | Wheeler | E21B 17/04 |

* cited by examiner

*Primary Examiner* — David B. Thomas
(74) *Attorney, Agent, or Firm* — Schwabe, Williamson & Wyatt, PC

(57) ABSTRACT

An adapter is provided which allows an external driving tool to drive a driven tool such as an intraosseous needle assembly, where the external driving tool would otherwise be incompatible with the needle assembly. The adapter includes a driver connector having a bore, where the bore is to receive an external driver of the external driving tool. The adapter further includes a driver attached to the driver connector. A cross-sectional shape of the bore is different than a cross-sectional shape of the attached driver. The attached driver includes resilient legs which assist in securing the adapter to the needle assembly. The resilient legs may include protuberances to secure the adapter.

24 Claims, 16 Drawing Sheets

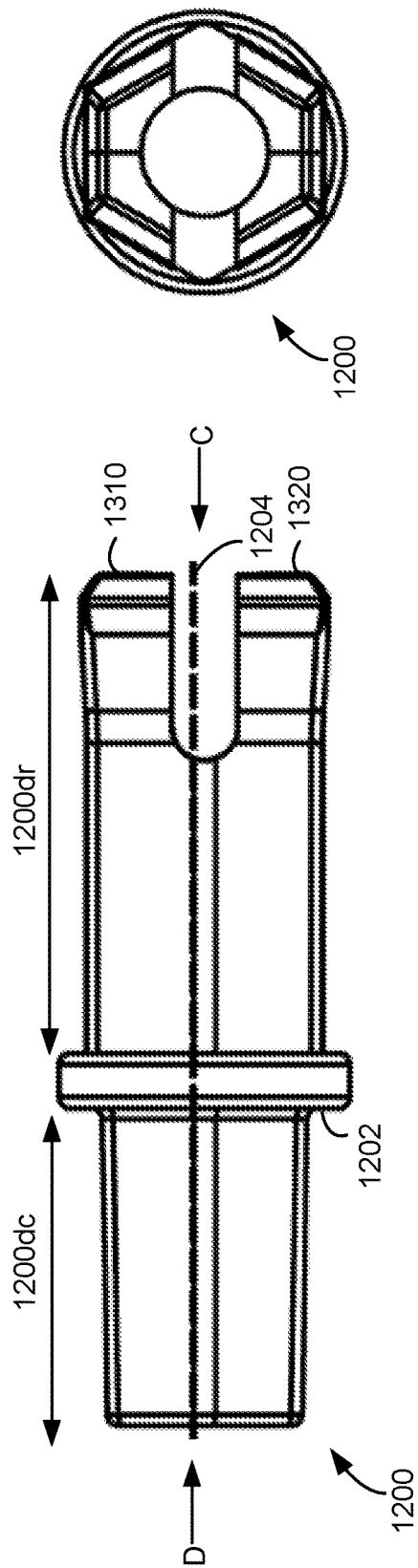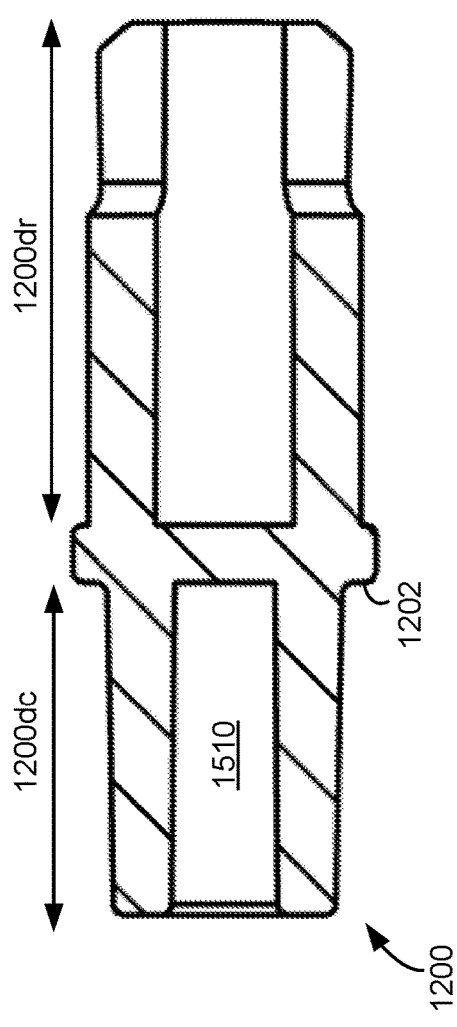
Fig. 13
Fig. 14
Fig. 15

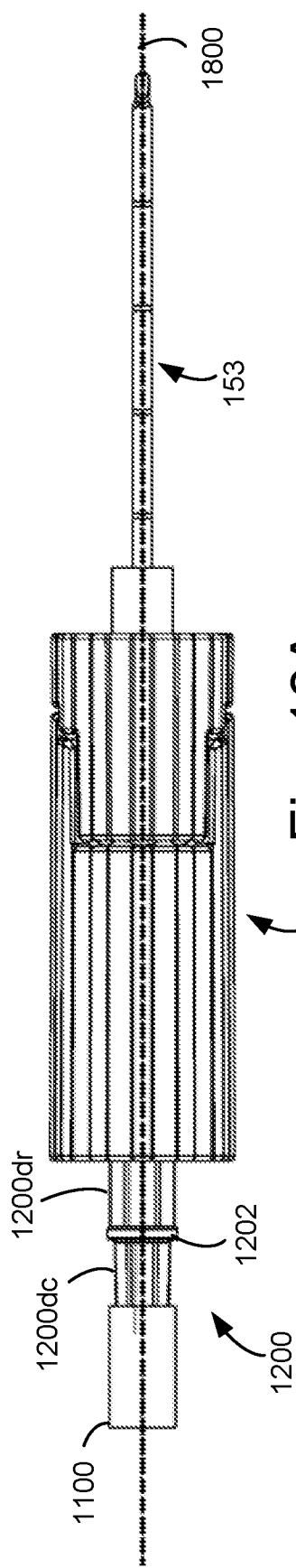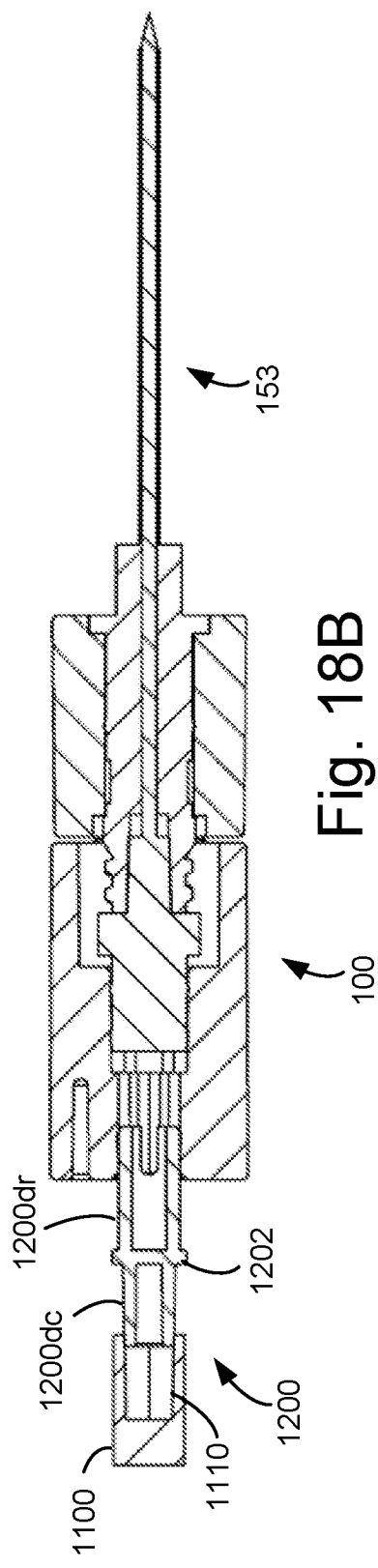

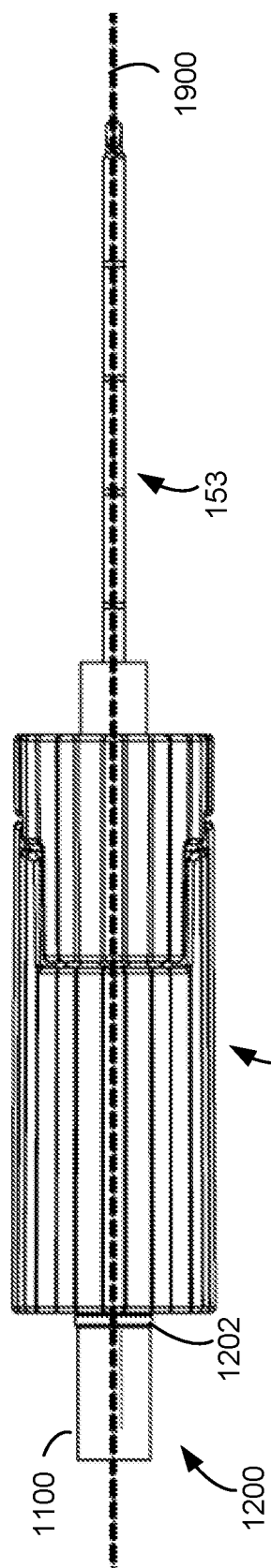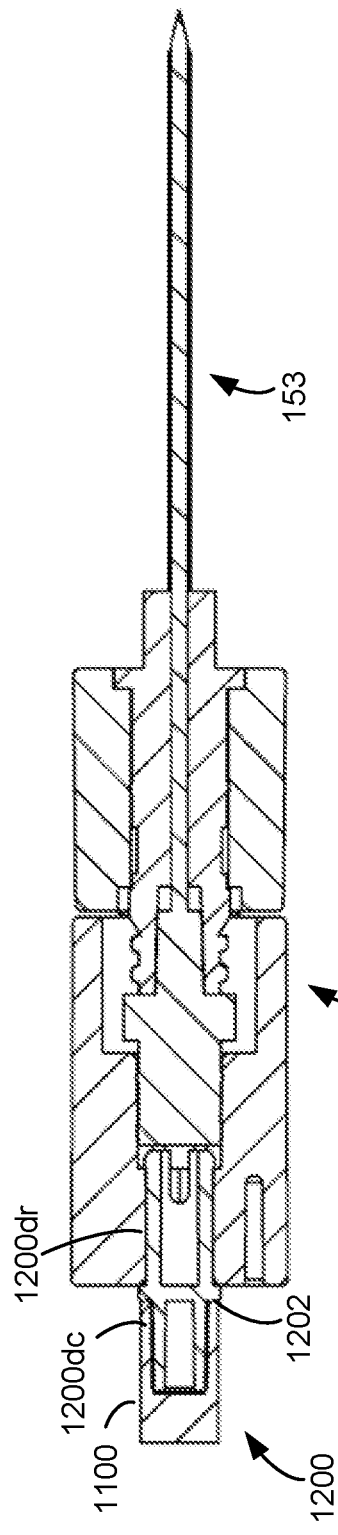
Fig. 19A
Fig. 19B

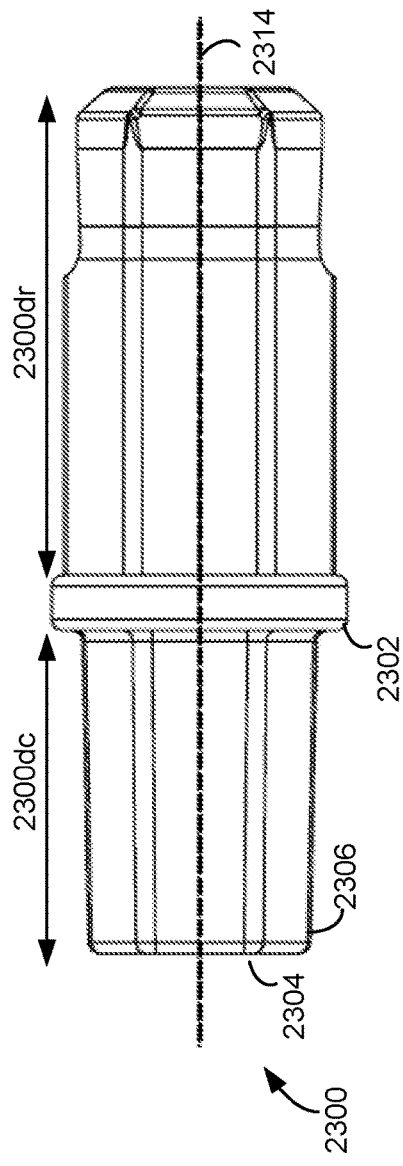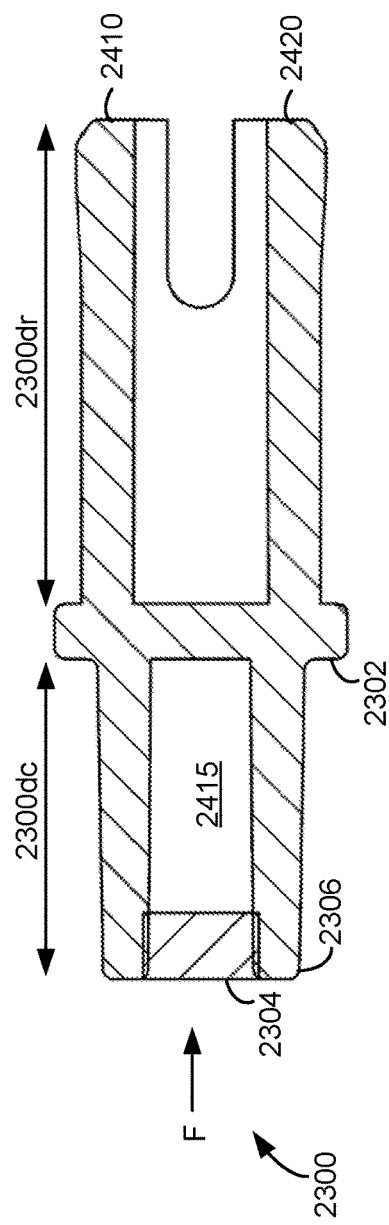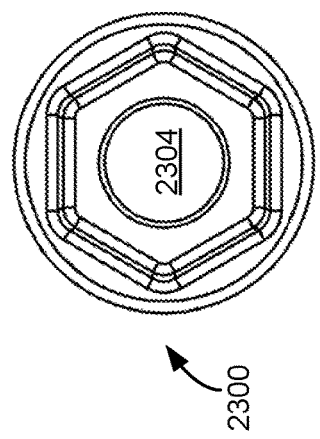

ADAPTER FOR INTRAOSSEOUS NEEDLE ASSEMBLY

FIELD

The present application generally relates to the field of medical devices and more particularly, to an adapter for a needle assembly which is inserted into the body.

BACKGROUND

Medical procedures often require injecting fluids such as medications into the body of a human or animal, or withdrawing fluids such as blood. Typically, the fluids can be injected via an intravenous (IV) injection, i.e., into a vein. However, IV injections are not possible for some patients. An alternative approach, particularly in emergencies, involves intraosseous access. In this approach, an intraosseous needle assembly is used in a process referred to as intraosseous cannulation. This process is often used by emergency medical technicians in the field.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 13 depicts a cross-sectional view of the adapter 1200 of FIG. 12, in accordance with various embodiments.

FIG. 14 depicts an end view of the adapter 1200 of FIG. 13 as seen in the direction of the arrow C, in accordance with various embodiments.

FIG. 15 depicts a cross-sectional view of the adapter 1200 of FIG. 13 along the line 1204, in accordance with various embodiments.

FIG. 18A depicts a side view of the adapter 1200, where the driver 1200dr is partially inserted into the needle assembly 100 of FIG. 12, and the connector 1200dc is partially inserted into the bore 1110 of the external driver 1100 of FIG. 11, in accordance with various embodiments.

FIG. 18B depicts a cross-sectional view of the adapter 1200 of FIG. 18A along the line 1800, in accordance with various embodiments.

FIG. 19A depicts a side view of the adapter 1200, where the driver 1200dr is fully inserted into the needle assembly 100 of FIG. 12, and the connector 1200dc is fully inserted into the bore 1110 of the external driver 1100 of FIG. 11, in accordance with various embodiments.

FIG. 19B depicts a cross-sectional view of the adapter 1200 of FIG. 19A along the line 1900, in accordance with various embodiments.

FIG. 23 depicts a cross-sectional view of an adapter 2300, in accordance with various embodiments.

FIG. 24 depicts a cross-sectional view of the adapter 2300 of FIG. 23 along the line 2314, in accordance with various embodiments.

FIG. 25 depicts an end view of the adapter 2300 of FIG. 23 as seen in the direction of the arrow F, in accordance with various embodiments.

DETAILED DESCRIPTION

Figure 1:
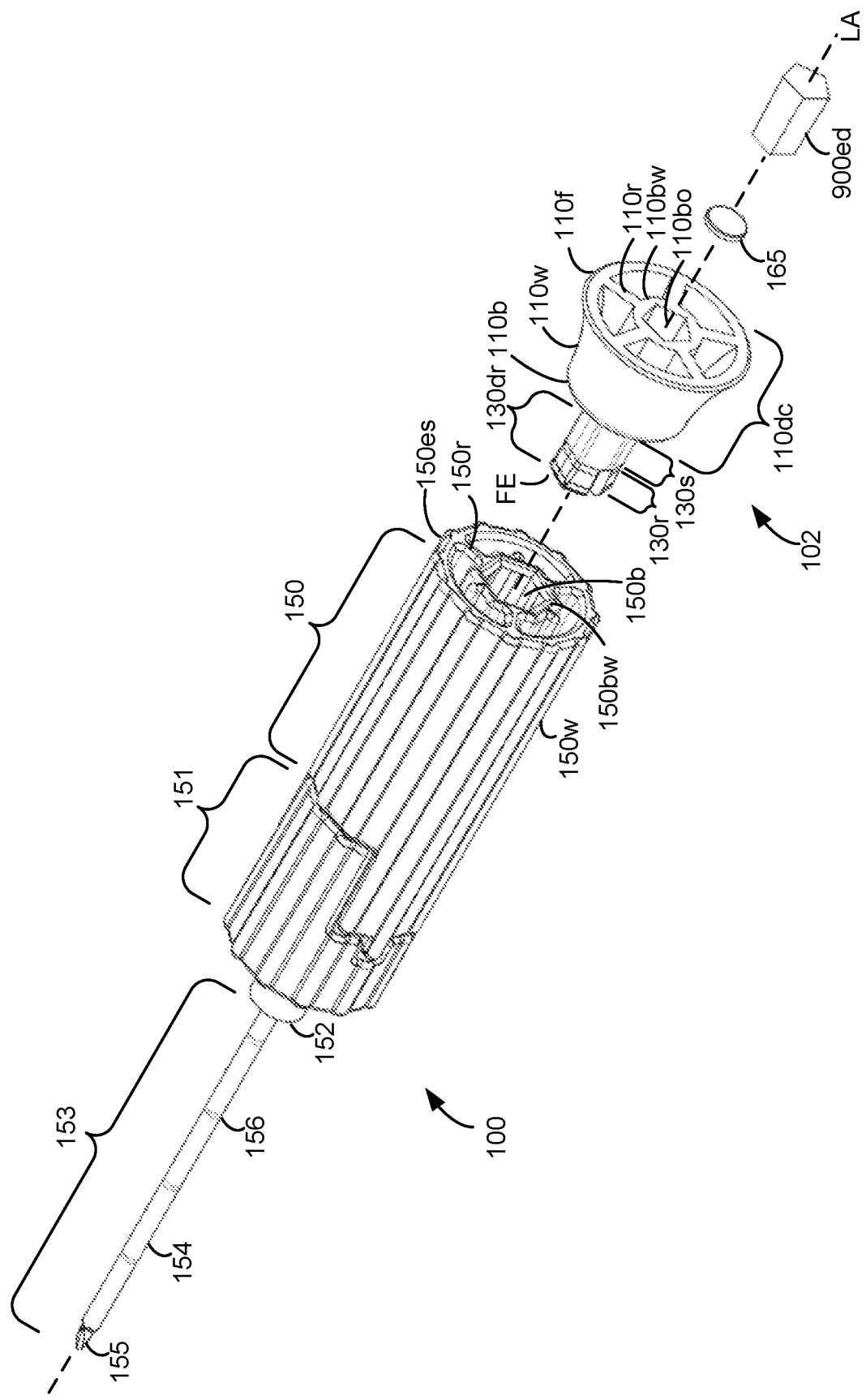
FIG. 1 depicts an isometric view of a needle assembly 100 and an adapter 102, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As mentioned at the outset, medical procedures such as intraosseous cannulation are often performed by emergency medical technicians (EMTs) or other medical personnel in the field or otherwise in emergency situations. These procedures must be performed quickly and accurately to stabilize a patient. Intraosseous cannulation is performed using a needle assembly which includes a sturdy needle which can be driven through cortical bone and into the medullary cavity to infuse fluids and blood products into the patient. Cortical bone is the dense outer surface of bone that forms a protective layer around the internal cavity. The medullary cavity is the hollow part of bone that contains bone marrow.

In one approach, the needle can be drive in manually by applying pressure to a handle which is attached to the needle assembly while performing a twisting motion. Another approach involves a manually operable driver which applies a rotational force to the needle assembly when the user pulls a lever of the driver. Another approach involves a motorized driver such as a battery-powered electric driver which applies a rotational force to the needle assembly when the user pushes a button to activate a motor of the driver. The needle may include depth gauge markings to indicate the extent to which the bone has been penetrated.

The user may select an appropriate needle assembly and attach the handle or other driver to it before proceeding. Different needle assemblies may have different lengths and diameters, for instance. The handle or other driver may include a driver bit which is inserted into a hexagonal bore of the needle assembly, for example, to ready the device for use. Once the needle is inserted into the patient, the handle or other driver is removed for subsequent re-use, and a catheter may be attached to the needle such as by using a Luer lock, to allow fluids to be injected.

However, needle assemblies and drivers of various manufacturers may not be compatible. Moreover, some medical personnel may prefer different types of drivers and needle assemblies which are incompatible. This creates difficulties in ensuring the appropriate equipment is available and potentially wastes time in locating a compatible driver and needle assembly. Another example scenario involves a disaster response in which different types of drivers and needle assemblies are supplied and there is no time to sort out which items are compatible with one another.

The apparatuses disclosed herein address the above and other issues.

In one aspect, an adapter is provided which allows an external driving tool to drive a driven tool such as an intraosseous needle assembly, where the external driving tool would otherwise be incompatible with the driven tool. The adapter includes a driver connector having a bore, e.g., an opening, where the bore is to receive an external driver of the external driving tool via a front end of the bore. The external driver has a shape which corresponds to a shape of the bore of the driver connector. For example, both the bore of the driver connector and the external driver may have a polygonal cross-section with a decreasing diameter.

The adapter further includes a driver attached to the driver connector. The driver and driver are on opposing sides of the adapter. The adapter connects to an external driver on one side and to a tool such as an intraosseous needle assembly on the other side, where the external driver is incompatible with the needle assembly. A shape of the bore of the driver connector may be different than a shape of the attached driver. For example, a polygonal cross-section of the bore of the driver connector may be different than a polygonal cross-section of the attached driver, e.g., the bore of the driver connector may have a hexagonal cross-section while the attached driver may have a pentagonal cross-section. In another example, the diameter of the bore of the driver connector may be different than the diameter of the attached driver. The external driving tool would not fit properly in the bore of the driven tool without the adapter as an intermediary.

The bore of the driver connector and the attached driver extend along a central longitudinal axis of the adapter. In use, the external driver is to exert a rotational force on the driven tool via the adapter.

In another aspect, the attached driver can include a shaft and resilient legs extending from the shaft. The legs have a groove between them so that they can move inwardly, toward one another, when the attached driver is inserted into the bore of the driven tool, to help provide a friction fit of the attached driver in the bore. The legs can further include protuberances which engage a surface of the driven tool when the attached driver is fully inserted into the bore of the driven tool. This helps secure the adapter to the driven tool.

In another aspect, a back end of the adapter can include a surface which abuts an end surface of the driven tool to stabilize the adapter relative to the driven tool.

In another aspect, the driver connector includes an outer wall which extends circumferentially about a bore wall from the front end to the back end of the driver connector, and ribs extending radially from the bore wall to the outer wall. The ribs, the outer wall and the bore wall may be coplanar at the front end of the driver connector, to stabilize the adapter relative to the external driver.

In another aspect, a diameter of the driver connector may be greater than a diameter of the attached driver to allow the adapter to be easily handled by a user.

The driven tool may be a needle assembly such as an intraosseous needle assembly, for example, or other tool which is driven by rotation and axial force.

These and other features will be apparent in view of the following discussion.

FIG. 1 depicts an isometric view of a needle assembly 100 and an adapter 102, in accordance with various embodiments. The needle assembly 100 includes a needle assembly connector 150, which is also a stylet, and a needle assembly hub 151. The needle assembly connector may be sized to slide on to, and off from, the needle assembly hub for easily installation and removal. A needle 153, or penetrator, is attached to the needle assembly hub 151 at a flange 152. The needle may include an outer cylinder 154 which surrounds a trocar 155. A trocar is a pointed hollow cylindrical device used to make small incisions and surgically insert cannulas into body cavities, or to aspirate fluids from the body. The outer cylinder 154 may include a number of depth gauge markings including an example depth gauge marking 156, which indicate how far the needle has been inserted into the body. The adapter and needle assembly may be made of a plastic such as polycarbonate.

The needle assembly 100 may have ridges to aid the user in gripping the assembly. The needle assembly 100 and the needle assembly connector 150 have an end surface 150es. Starting at the end surface and extending partway into the needle assembly, a bore 150b is defined by a bore wall 150bw and extends along a longitudinal axis LA. The LA may be a central LA of the needle assembly and the adapter. The bore wall 150bw is secured to an outer wall 150w of the needle assembly by radial ribs such as an example rib 150r.

The needle assembly is configured to attach to the adapter 102. The adapter includes an attached driver 130dr which is configured to be inserted into the bore 150b. The attached driver may include a shaft 130s and a resilient portion 130r. The resilient portion may include resilient legs which facilitate the insertion of the attached driver 130dr into the bore and the securing of the adapter to the needle assembly. The adapter further include a driver connector 110dc including a central bore 110bo defined by bore walls 110bw. An outer wall 110w is connected to the bore walls by radial ribs such as an example rib 110r. The outer wall 110w can define a bell shape of the driver connector 110dc as shown or some other shape such as a cylinder or a conical frustum. The cores or voids formed between the ribs allow the driver connector 110dc to be easily molded.

A ferromagnetic metal piece 165 such as a metal disc is inserted into the bore 110bo to facilitate securing the adapter to an external driver 900ed, which may have a magnetized tip. The driver connector 110dc includes a front end 110f at which the ribs, the outer wall and the bore wall are coplanar to stabilize the adapter relative to an external driving tool. The external driver is connected to a driving tool such as the driving tool 900 of FIG. 9.

Once the adapter is secured to the needle assembly and the driving tool, the driving tool is operated to rotate the adapter and needle assembly while the user also provides force to the driving tool along the longitudinal axis to drive the needle into the patient. The resilient legs and other features such as protuberances, as described further below, help secure the adapter to the needle assembly. For example, as the combination of the driving tool, adapter and needle assembly is positioned by the user, the adapter helps keep the combination together. This helps prevent the needle assembly from falling off due to gravity, for instance.

Once the needle is in position in the patient, the adapter is removed from it. In one approach, the user holds the needle assembly hub 151 with one hand and pulls the needle assembly connector 150 away from it with the other hand. The adapter 102 can be removed from the needle assembly connector 150 by holding the needle assembly connector with one hand and pulling the adapter away from it with the other hand. The adapter can be removed from the driving tool by holding the driving tool with one hand and pulling the adapter away from it with the other hand. It is also possible to detach the adapter from the needle assembly connector before detaching the needle assembly connector from the needle assembly hub. In another approach, the user holds the needle assembly hub 151 with one and pulls the driving tool 900 away from it with the other hand, while the adapter is still secured to the driving tool and the needle assembly connector. Various approaches are possible. The ability of the adapter to hold to the needle assembly connector helps facilitate this process and avoid the different components detaching from one another and being lost, damaged or contaminated.

Figure 2:
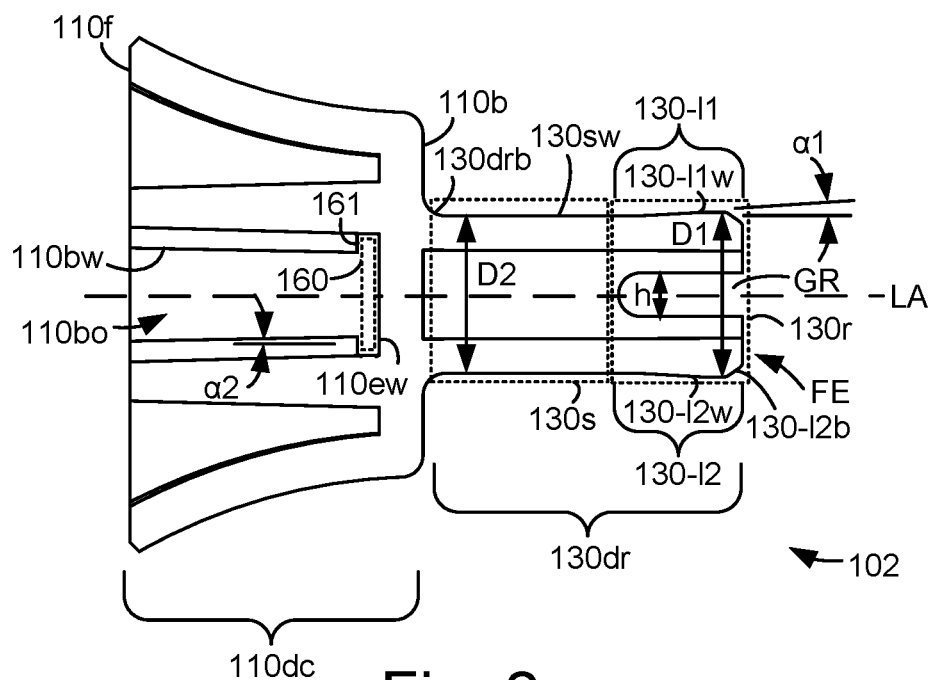
FIG. 2 depicts a cross-sectional view of the adapter 102 of FIG. 1, including outwardly sloping resilient legs 130-11 and 130-12, in accordance with various embodiments.

FIG. 2 depicts a cross-sectional view of the adapter 102 of FIG. 1, including outwardly sloping resilient legs 130-11 and 130-12, in accordance with various embodiments. The driver connector 110dc includes the bore wall 110bw which extends circumferentially about the longitudinal axis LA to define the bore 110bo. The bore wall may slope inwardly, or be tapered, at an angle α2 moving from the front end 110f to the back end 110b of the driver connector 110dc. This angle may be greater than 0 degrees and up to 5-10 degrees, for example. The angle is 1.5 degrees in an example implementation. The sloped bore facilitates the insertion of the external driver 900ed.

In an example embodiment, the bore of the driver connector is a tapered pentagon-shaped female end that attaches to a tapered pentagon shaped male end of the external driver 900ed, and the attached driver 130dr is a hexagon-shaped male end that attaches to a hexagon-shaped female end of the needle assembly.

The bore 110bo includes a region 160 with a stepped-up diameter adjacent to an end wall 110ew of the bore. The ferromagnetic metal piece 165 can be retained in the region of the bore with the stepped-up diameter in an interference fit. The metal piece can be retained by a circumferential end surface 161 of the bore wall 110bw.

The attached driver 130dr of the adapter includes the shaft 130s and the resilient portion 130r, outlined in respective dotted line boxes. The attached driver 130dr extends from a base 130drb to a free end Ph. The resilient portion 130r extends from the shaft 130s to the free end. The shaft has a fixed diameter D2, in one implementation, while the resilient portion comprises legs with outwardly sloping or flared walls. The shaft may have side walls 130sw which are parallel to the LA. In the resilient portion, a first leg 130-11 includes an outwardly sloping wall 130-11w and a second leg 130-12 includes an outwardly sloping wall 130-12w. The walls may slope outwardly at an angle α1 moving in a direction from the shaft 130s or the base 130drb toward the free end. This angle may be greater than 0 degrees and up to 5-10 degrees, for example. The angle is 3 degrees in an example implementation. In this example, the resilient portion include two opposing legs, but two or more legs can be used. Due to the outward sloping of the legs, the widest diameter D1 of the resilient portion is wider than D2, the diameter of the shaft. The shaft is not resilient, in one possible implementation.

The resilient portion is so-named because the legs can move inwardly when the attached driver is inserted into the bore 150b of the needle assembly. When the attached driver is removed from the bore, the legs can return to their original position. The legs are defined by a groove GR or relief of height h.

The legs may also include a chamfer or beveled edge which facilitates the insertion of the legs into the bore 150b of the needle assembly. For example, the leg 130-12 includes a beveled edge 130-12b at an angle such as 35 degrees relative to the LA. An example range of angles which may be used is 10-45 degrees.

Figure 3:
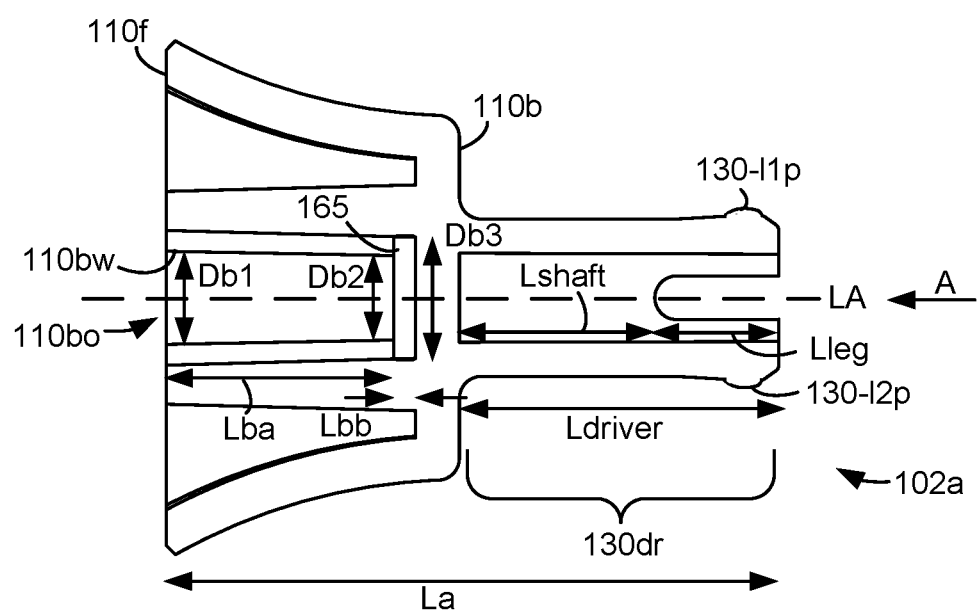
FIG. 3 depicts a cross-sectional view of an adapter 102a correspond to the adapter 102 of FIG. 1, including the resilient legs 130-11 and 130-12 with protrusions 130-11p and 130-12p, respectively, in accordance with various embodiments.

FIG. 3 depicts a cross-sectional view of an adapter 102a correspond to the adapter 102 of FIG. 1, including the resilient legs 130-11 and 130-12 with protrusions 130-11p and 130-12p, respectively, in accordance with various embodiments. The sloping of the bore walls 110bw results in a decreasing diameter of the bore 110bo moving in a direction from the front end 110f to the back end 100b of the driver connector 110dc. In particular, the bore 110bo has a diameter which decreases from Db1 at the front end to Db2<Db1 over a length Lba, to a point which is just before the ferromagnetic metal piece 165 in the region 160 with the stepped-up diameter Db3. The region 160 of the bore has a length Lbb. The lengths are in the direction of the LA.

The ferromagnetic metal piece 165 disc may be over sized relative to the diameter Db2 of the bore 110bo. To install the metal piece, it may be pressed into the bore by a tool until it reaches the end wall 110ew and the stepped up diameter region 160, where it is permanently seated against the end wall and the end surface 161 of the bore wall 110bw. This is an interference fit, also known as a press fit. When the external driver 900ed is inserted into the bore 110bo, the ferromagnetic metal piece forms a magnetic bond with the magnetic tip of the external driver 900ed to help secure the adapter to the external driver 900ed.

The attached driver 130dr has a length Ldriver, including the length of the shaft, Lshaft, and the length of the legs, Lleg. LLeg can be a specified portion of Ldriver such as 20-70%. The attached driver 130dr is more robust to twisting force if the shaft is longer, while the legs are more bendable if they are longer. The height h of the groove is also a factor. A larger height corresponds to an increased ability of the legs to bend. By including both a shaft, which is non-resilient or non-bendable, and legs, which are resilient and bendable, the robustness of the attached driver to rotational forces, and the holding ability of the adapter to the needle assembly, can be optimized.

In this example, the legs have protuberances or retention bumps to help hold the adapter in the needle assembly. For example, the legs 130-11 and 130-12 have protuberances 130-11p and 130-12p, respectively. The protuberances may be rounded surfaces which extend outwardly, relative to the LA. The protuberances may be at the point of the legs which has the largest diameter or greatest distance from the LA.

Example dimensions for the adapter are as follows: adapter length La=0.84 inches, Ldriver=0.438, Lleg=0.17 inches, h=0.06 inches, D1=0.226 inches, radius of protuberances=0.01 inches, radius of base 130drb=0.03 inches.

Figure 4:
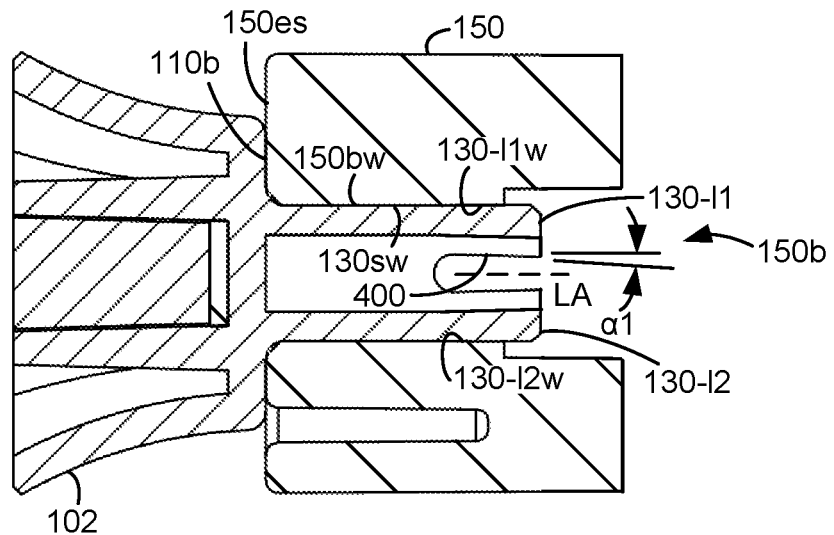
FIG. 4 depicts a cross-sectional view of the adapter 102 of FIGS. 1 and 2 when it is inserted into a bore 150b of the needle assembly connector 150, in accordance with various embodiments.

FIG. 4 depicts a cross-sectional view of the adapter 102 of FIGS. 1 and 2 when it is inserted into a bore 150b of the needle assembly connector 150, in accordance with various embodiments. When the attached driver of the adapter is inserted into the bore 150b, the legs will bend slightly inwardly to fit into the bore, which may have a fixed diameter. The bore 150b may have a cross-sectional shape which matches a cross-sectional shape of the attached driver. For example, a polygonal cross-section may be used such as a pentagon or hexagon. The inward bending of the legs is depicted by the inner wall 400 of the leg 130-11 bending at the angle $\alpha 1$ relative to the LA.

The side wall 130sw of the shaft is in contact with a bore wall 150bw of the bore 150b of the needle assembly. These two walls may be parallel to one another and to the LA. The outer walls of the legs will move inward so that they are also in contact with and parallel to the bore wall 150bw. For example, the wall 130-11w of the first leg 130-11 and the wall 130-12w of the second leg 130-12 are depicted. These walls are parallel to one another. Due to the inward movement of the legs and their resilience, they will form a friction fit in the bore 150b. That is, the legs will be under a tension which causes them to exert an outward force on the bore walls.

Figure 5A:
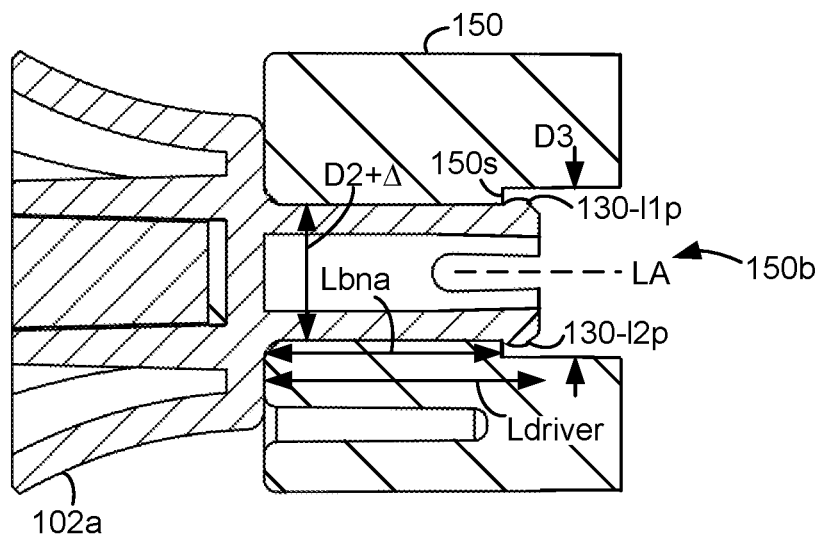
FIG. 5A depicts a cross-sectional view of the adapter 102a of FIG. 3 when it is inserted into a bore 150b of the needle assembly connector 150, in accordance with various embodiments.

FIG. 5A depicts a cross-sectional view of the adapter 102a of FIG. 3 when it is inserted into a bore 150b of the needle assembly connector 150, in accordance with various embodiments. This example shows how the protuberances 130-11p and 130-12p help hold the adapter in the needle assembly. When the attached driver is fully inserted into the bore 150b, the protuberances will reach a position in which they contact an inner wall of the bore. For example, the protuberance 130-11p contacts an inner wall 150s or surface of the bore. The inner wall 150s is at a portion of the bore in which the diameter increases from D2+Δ to D3. The inner wall may extend perpendicular to the LA. Δ is a small amount which indicates the diameter of the bore is just slightly larger than D2, the diameter of the shaft of the attached driver.

The protuberances 130-11p and 130-12p help hold the adapter in the needle assembly because they provide some resistance to the adapter pulling out from the bore of the needle assembly. However, due to the rounded shape and the relatively small height of the protuberances, the resistance is not too great, so that the adapter can still be manually inserted into and removed from the bore. The protuberances may be raised regions which extend circumferentially around the legs, in one approach. See FIG. 5B. In another option, one or more discrete protuberances are provided on each leg. For example, multiple circular or dot-shaped protuberances may be spaced apart from one another along the circumference of each leg, or circumferentially on the leg. See FIG. 5C.

In addition to providing a holding force of the adapter in the needle assembly, the protuberances can provide a snap fit of the attached driver in the bore of the needle assembly. When the adapter is inserted sufficiently into the bore 150b, the protuberance are free from the restricted diameter D2+Δ of the bore and may snap outward slightly due to the resilience of the legs. This snapping motion and sound provides feedback to the user that the adapter has been seated in the needle assembly.

Figure 5B:
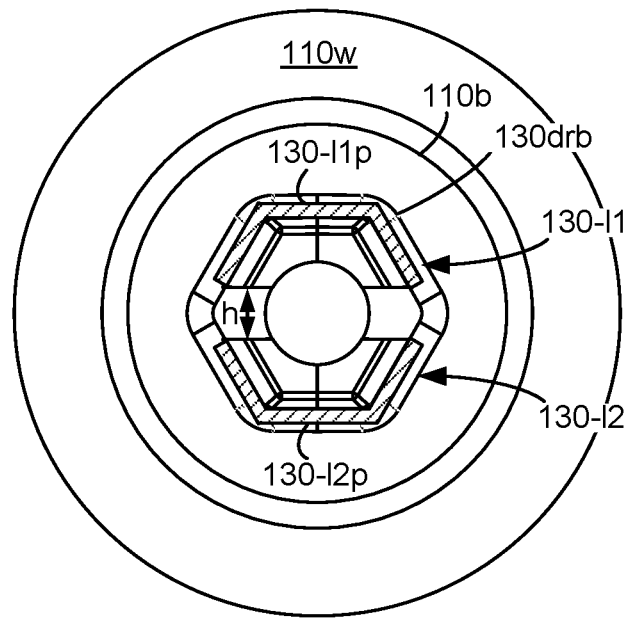
FIG. 5B depicts a view of the adapter 102a of FIG. 3 in a direction of arrow A, where the protuberances 130-11p and 130-12p are raised regions which extend circumferentially around the legs 130-11 and 130-12, respectively, in accordance with various embodiments.

FIG. 5B depicts a view of the adapter 102a of FIG. 3 in a direction of arrow A, where the protuberances 130-11p and 130-12p are raised regions which extend circumferentially around the legs 130-11 and 130-12, respectively, in accordance with various embodiments. The figure also depicts the outer wall 110w of the driver connector, the back end 110b of the driver connector and the base 130drb of the attached driver 130dr. The height h of the groove between the legs is also depicted.

Figure 5C:
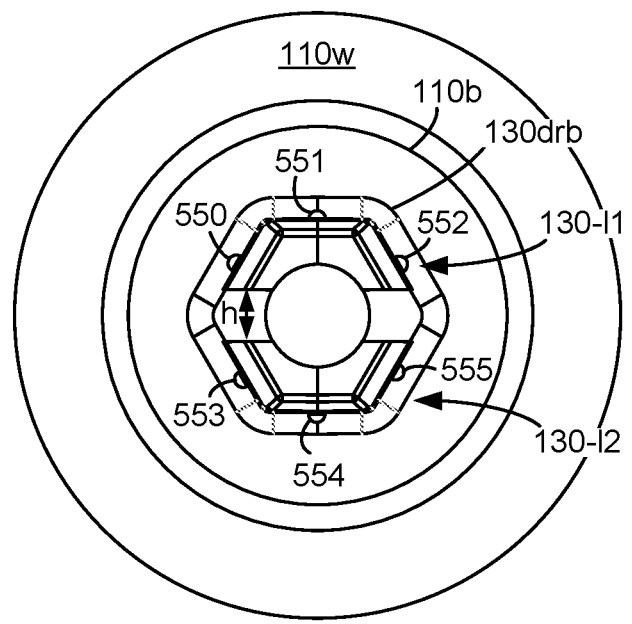
FIG. 5C depicts an alternative view of the adapter 102a of FIG. 3 in a direction of arrow A, where multiple dot-shaped protuberances are spaced apart from one another along the circumference of each leg 130-11 and 130-12, in accordance with various embodiments.

FIG. 5C depicts an alternative view of the adapter 102a of FIG. 3 in a direction of arrow A, where multiple dot-shaped protuberances are spaced apart from one another along the circumference of each leg 130-11 and 130-12, in accordance with various embodiments. For example, the leg 130-11 includes protuberances 550-552, where the protuberance 551 corresponds to the protuberance 130-11p depicted in FIG. 3. The leg 130-12 includes protuberances 553-555, where the protuberance 554 corresponds to the protuberance 130-12p depicted in FIG. 3. In this example, each leg has three sides or walls and there is one protuberance on each side or wall. Other options are possible, such as multiple protuberances on each side. Another option is to have one or more protuberances on one side or wall of a leg and no protuberances on one or more other sides or walls of the leg.

Figure 6A:
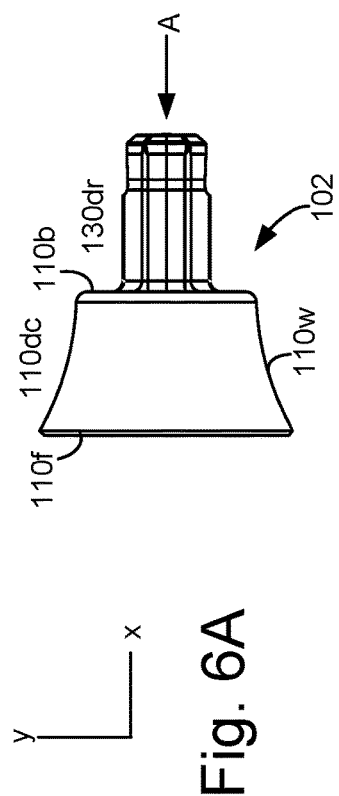
FIG. 6A depicts a top view of the adapter 102 of FIGS. 1 and 2 in an x-y plane, in accordance with various embodiments.

FIG. 6A depicts a top view of the adapter 102 of FIGS. 1 and 2 in an x-y plane, in accordance with various embodiments. The figure depicts the driver connector 110dc including its front end 110f, outer wall 110w and back end 110b. The figure also depicts the attached driver 130dr.

Figure 6B:
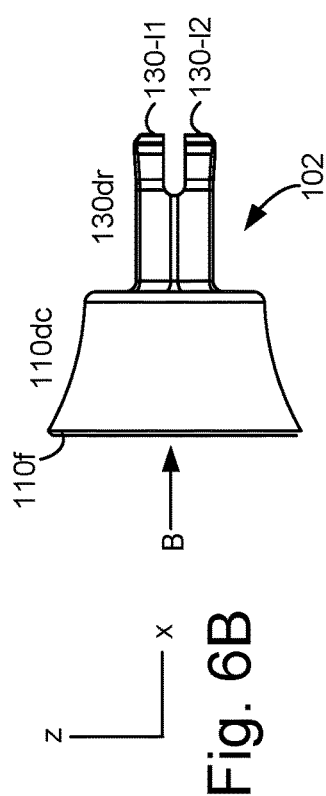
FIG. 6B depicts a side view of the adapter 102 of FIGS. 1 and 2 in an x-z plane, in accordance with various embodiments.

FIG. 6B depicts a side view of the adapter 102 of FIGS. 1 and 2 in an x-z plane, in accordance with various embodiments. The figure depicts the opposing legs 130-11 and 130-12 of the attached driver 130dr.

Figure 6C:
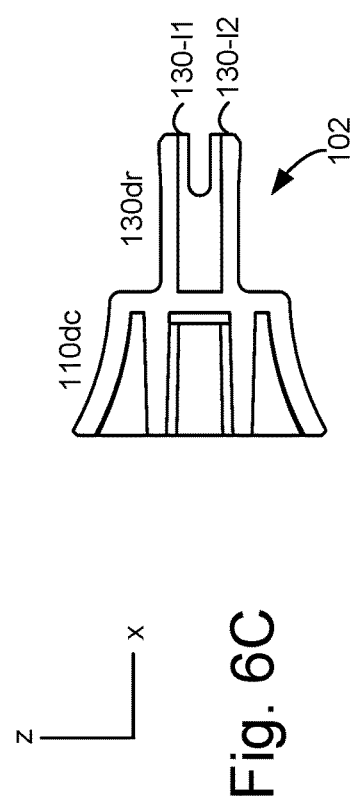
FIG. 6C depicts a cross-sectional view of the adapter 102 of FIG. 6A, in an x-z plane, in accordance with various embodiments.

FIG. 6C depicts a cross-sectional view of the adapter 102 of FIG. 6A, in an x-z plane, in accordance with various embodiments. The figure depicts the opposing legs 130-11 and 130-12 of the attached driver 130dr in a cross-section.

Figure 6D:
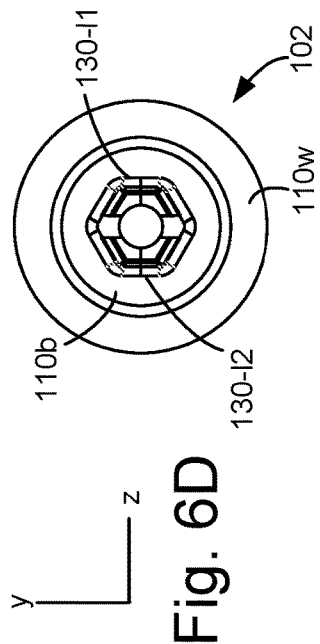
FIG. 6D depicts a back view of the adapter 102 of FIG. 6A in the direction of arrow A, in a y-z plane, in accordance with various embodiments.

FIG. 6D depicts a back view of the adapter 102 of FIG. 6A in the direction of arrow A, in a y-z plane, in accordance with various embodiments. The figure depicts the outer wall 110w and back end 110b of the driver connector 110dc, in addition to the legs 130-11 and 130-12. The legs, and the shaft, of the attached driver have a hexagonal cross-section, in this example. This allows the adapter to impart a rotational force on the needle assemble when inserted into the bore of the needle assembly. Other cross-sectional shapes such as a pentagon can be used. A polygon with three or more sides can be used. The outer wall 110w has a circular cross-sectional shape, but other shapes may be used.

Figure 6E:
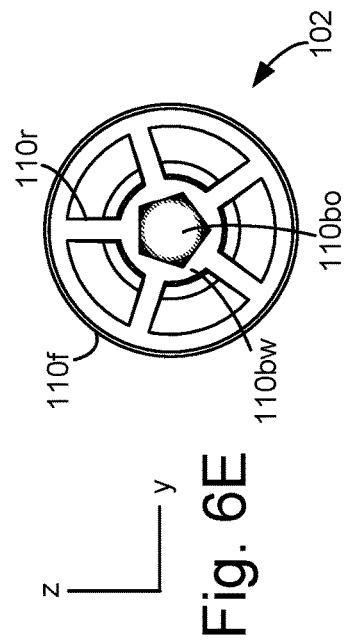
FIG. 6E depicts a front view of the adapter 102 of FIG. 6B in the direction of arrow B, in a y-z plane, in accordance with various embodiments.

FIG. 6E depicts a front view of the adapter 102 of FIG. 6B in the direction of arrow B, in a y-z plane, in accordance with various embodiments. The figure depicts the front end 110f, bore walls 110bw, bore 110bo and radial ribs 110r of the driver connector. The bore 110b0 has a pentagonal cross-section in this example. The adapter therefore provides a translation between a pentagonal shape, in terms of the external driver 900ed and the bore 110bo, and a hexagonal shape, in terms of the attached driver 130dr and the bore 150b, in this example.

Figure 6F:
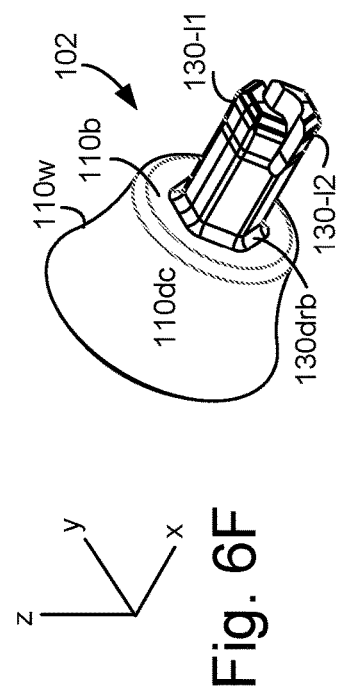
FIG. 6F depicts an isometric view of the adapter 102 of FIG. 6A, in accordance with various embodiments.

FIG. 6F depicts an isometric view of the adapter 102 of FIG. 6A, in accordance with various embodiments. The figure depicts the driver connector 110dc with its outer wall 110w and back end 110b. The attached driver 130dr is also depicted with its base 130drb and legs 130-11 and 130-12.

Figure 7A:
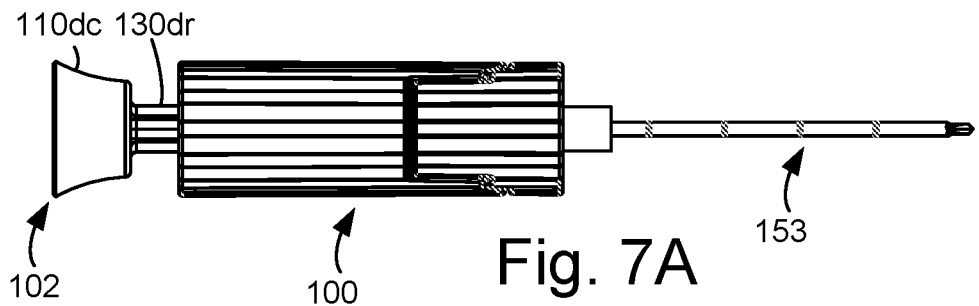
FIG. 7A depicts a side view of the adapter 102 partially inserted into the needle assembly 100 of FIG. 1, in accordance with various embodiments.

FIG. 7A depicts a side view of the adapter 102 partially inserted into the needle assembly 100 of FIG. 1, in accordance with various embodiments. The driver connector 110dc and attached driver 130dr are depicted in a configuration in which the adapter 102 is partially inserted into the needle assembly 100. The needle 153 and outer cylinder 154 of the needle are also depicted.

Figure 7B:
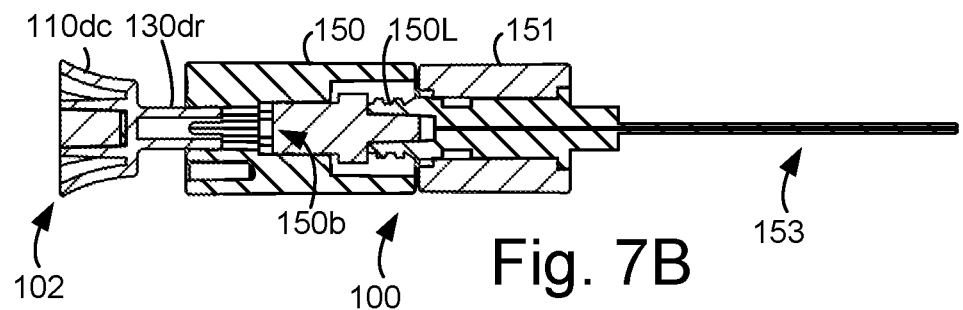
FIG. 7B depicts a cross-sectional view of the adapter 102 and needle assembly 100 of FIG. 7A, in accordance with various embodiments.

FIG. 7B depicts a cross-sectional view of the adapter 102 and needle assembly 100 of FIG. 7A, in accordance with various embodiments. The figure shows the attached driver 130dr partially inserted into the bore 150b of the needle assembly connector 150 of the needle assembly 100. A Luer lock 150L is also depicted as for use in attaching a catheter to the needle after it is inserted into the patient. The Luer lock is attached to the needle assembly hub 151.

Figure 8A:
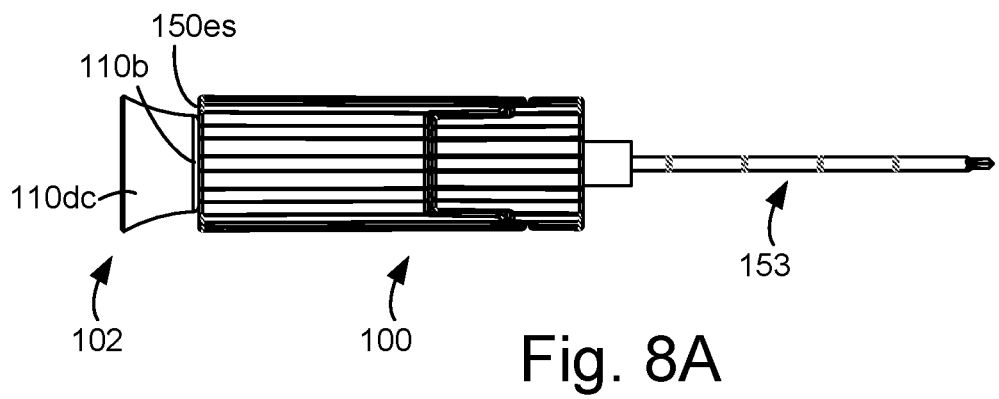
FIG. 8A depicts a side view of the adapter 102 fully inserted into the needle assembly 100 of FIG. 1, in accordance with various embodiments.

FIG. 8A depicts a side view of the adapter 102 fully inserted into the needle assembly 100 of FIG. 1, in accordance with various embodiments. The driver connector 110dc and attached driver 130dr are depicted in a configuration in which the adapter 102 is fully inserted into the needle assembly 100. The back end 110b of the driver connector 110dc abuts the end surface 150es of the needle assembly to stabilize the adapter relative to the needle assembly. That is, tilting of the adapter relative to the LA is prevented. See also FIG. 4.

Figure 8B:
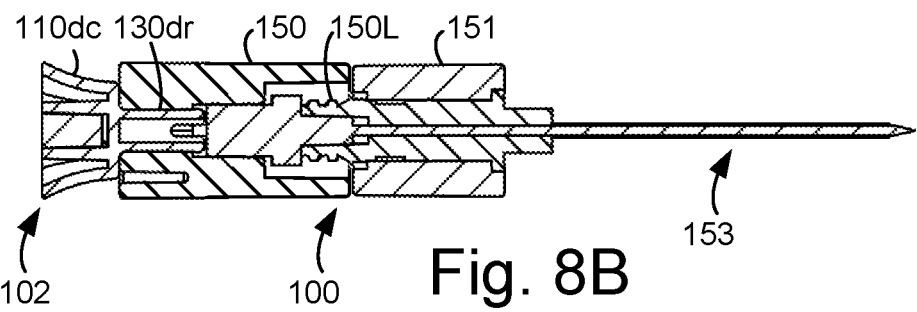
FIG. 8B depicts a cross-sectional view of the adapter 102 and needle assembly 100 of FIG. 8A, in accordance with various embodiments.

FIG. 8B depicts a cross-sectional view of the adapter 102 and needle assembly 100 of FIG. 8A, in accordance with various embodiments. With the attached driver 130dr fully inserted into the bore of the needle assembly, the tips of the legs are free of the bore and can help retain the attached driver 130dr in the bore, as discussed, e.g., in connection with FIG. 4-5C.

Figure 9:
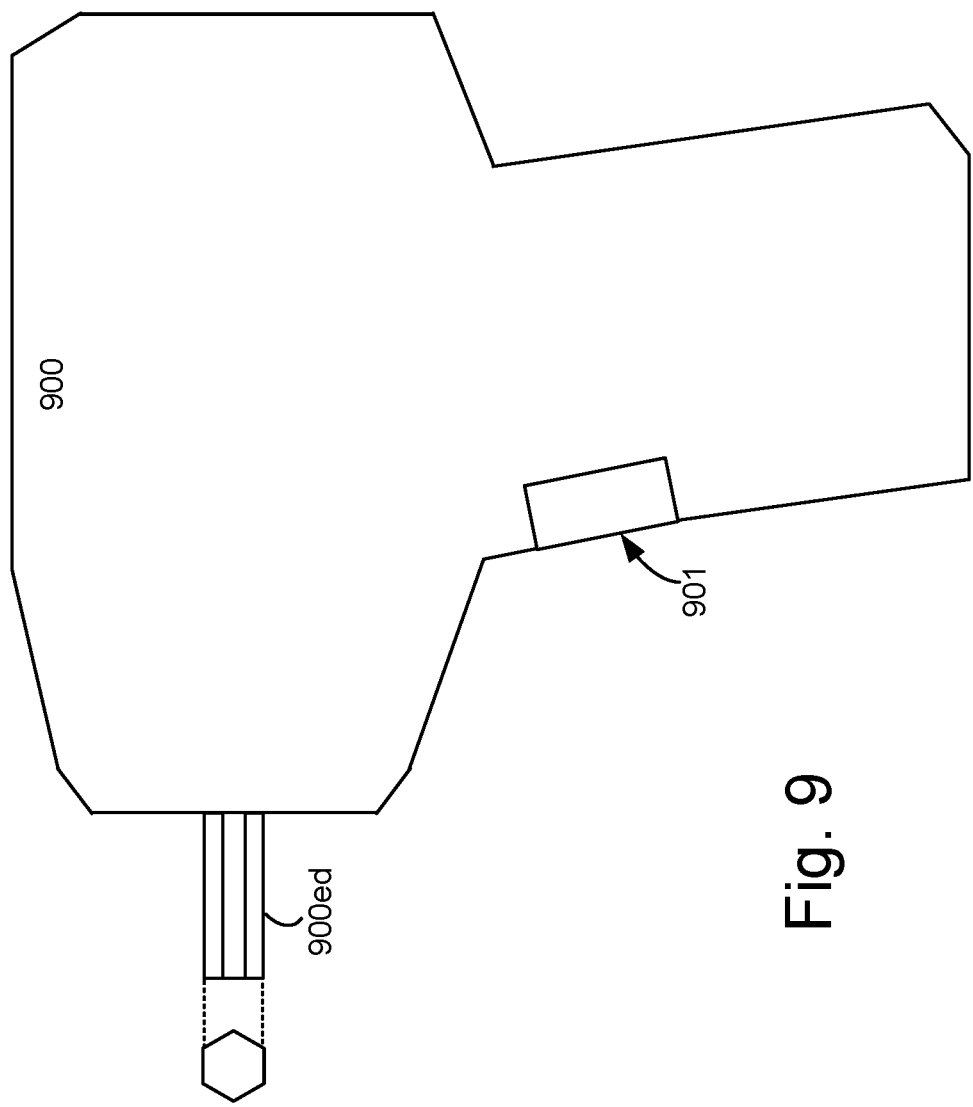
FIG. 9 depicts an example motorized driver 900 having an external driver 900ed for driving the adapter 102 of FIG. 1.

FIG. 9 depicts an example motorized driver 900 having an external driver 900ed for driving the adapter 102 of FIG. 1. As mentioned, a tool such as a needle assembly as described herein can be driven manually using a handle, a manually operable driver or a motorized driver such as a battery-powered electric driver. Motorized drivers are popular since they ease the workload of the user. A button 901 is pressed by the user to actuate a motor which rotates the external driver 900ed. The external driver 900ed may have a hexagonal cross-section as depicted. The external driver 900ed may be a male component which fits into the female central bore 110bo of the adapter 102.

Figure 10:
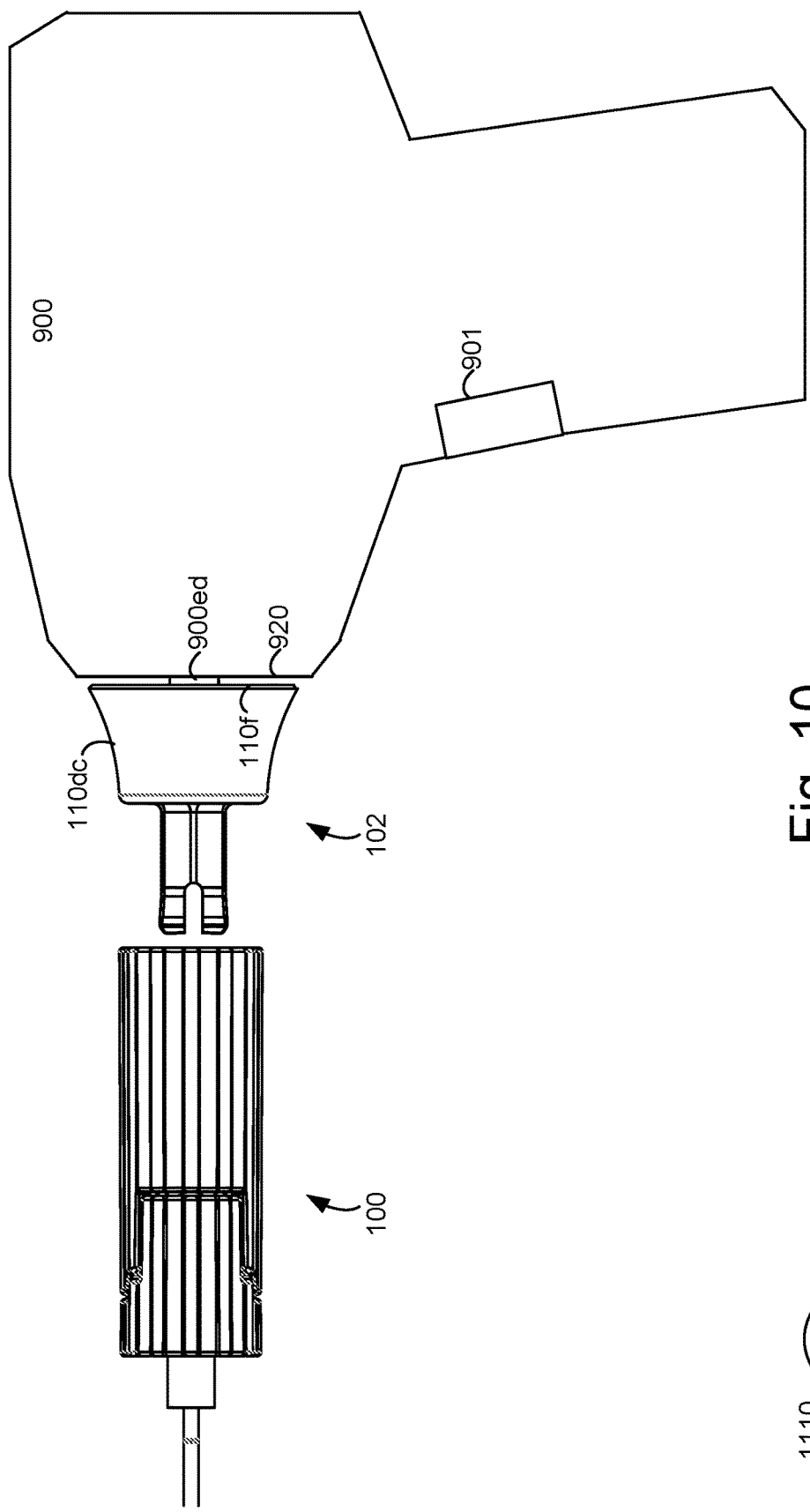
FIG. 10 depicts the motorized driver 900 of FIG. 9 with the adapter 102 attached, and the needle assembly 100 of FIG. 1, in accordance with various embodiments.

FIG. 10 depicts the motorized driver 900 of FIG. 9 with the adapter 102 attached, and the needle assembly 100 of FIG. 1, in accordance with various embodiments. The adapter 102 is attached to the external driver 900ed of the motorized driver 900. The front end 110f of the adapter may abut a surface 920 of the motorized driver 900 to stabilize the adapter relative to the external driver. For example, the outer wall, bore wall and ribs of the driver connector may be coplanar at the front end of the driver connector. The user can attach the needle assembly to the adapter to make the tool read for use.

Figure 11:
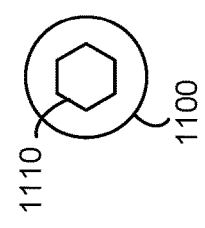
FIG. 11 depicts a front view of an external driver 1100 having a hexagonal bore 1110.

FIG. 11 depicts a front view of an external driver 1100 having a hexagonal bore 1110. As an alternative to FIG. 9, the external driver 1100 may have a female hexagonal bore. The driver may be a female component which fits with a male component of an adapter, as discussed below. The external driver can be part of a motorized driver similar to what is shown in FIG. 9.

Figure 12:
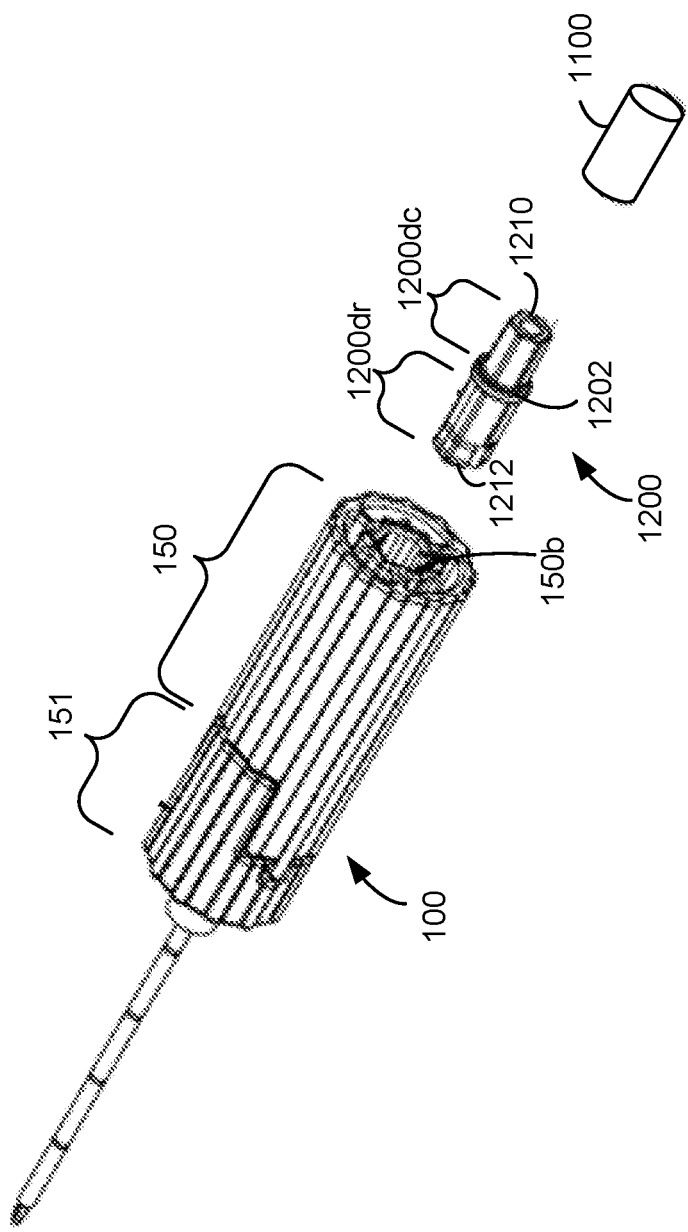
FIG. 12 depicts an isometric view of the needle assembly 100 of FIG. 1 with an adapter 1200, in accordance with various embodiments.

FIG. 12 depicts an isometric view of the needle assembly 100 of FIG. 1 with an adapter 1200, in accordance with various embodiments. The adapter includes a driver 1200dr and a connector 1200dc, separated by a flange 1202. The driver 1200dr is the same as the attached driver 130dr of FIG. 1, in one implementation. The connector is hexagonal or other polygonal shaft which is tapered or non-tapered in diameter. The driver 1200dr is a male component which fits in the bore 150b of the needle assembly connector 150. The connector 1200dc is a male component which fits in the bore 1110 of the external driver 1100. The flange, or projecting rim, strengthens the adapter and maintains the driver and connector in an appropriate position/insertion depth relative to the bore 150b and the bore 1110, respectively. The driver 1200dr extends from the flange 1202 to a respective free end 1212 and the connector 1200dc extends from the flange 1202 to a respective free end 1210.

FIG. 13 depicts a cross-sectional view of the adapter 1200 of FIG. 12, in accordance with various embodiments. The driver 1200*dr*, connector 1200*dc* and flange 1202 are depicted. As mentioned, the driver can be the same as the as the attached driver 130*dr* of FIG. 1, in one implementation. In this case, the driver 1200*dr* includes opposing resilient legs 1310 and 1320 to help secure the adapter in the bore 150*b* of the needle assembly connector 150.

FIG. 14 depicts an end view of the adapter 1200 of FIG. 13 as seen in the direction of the arrow C, in accordance with various embodiments. The end view is similar to that of FIGS. 5B and 5C. The protrusions 130-11*p* and 130-12*p* of FIG. 5B or protuberances 550-555 of FIG. 5C are not depicted but can optionally be provided.

FIG. 15 depicts a cross-sectional view of the adapter 1200 of FIG. 13 along the line 1204, in accordance with various embodiments. The view indicates a hollow region or bore 1510 within the driver connector 1200*dc*.

Figure 16:
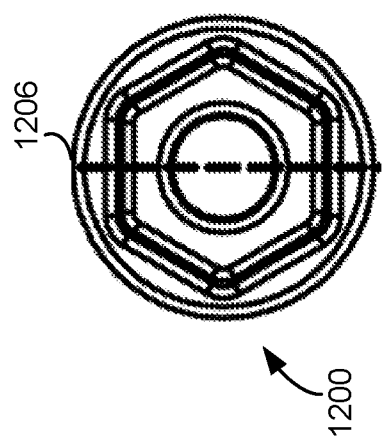
FIG. 16 depicts an end view of the adapter 1200 of FIG. 13 as seen in the direction of the arrow D, in accordance with various embodiments.

FIG. 16 depicts an end view of the adapter 1200 of FIG. 13 as seen in the direction of the arrow D, in accordance with various embodiments. The end view depicts the hexagonal shape of the driver connector 1200*dc*.

Figure 17:
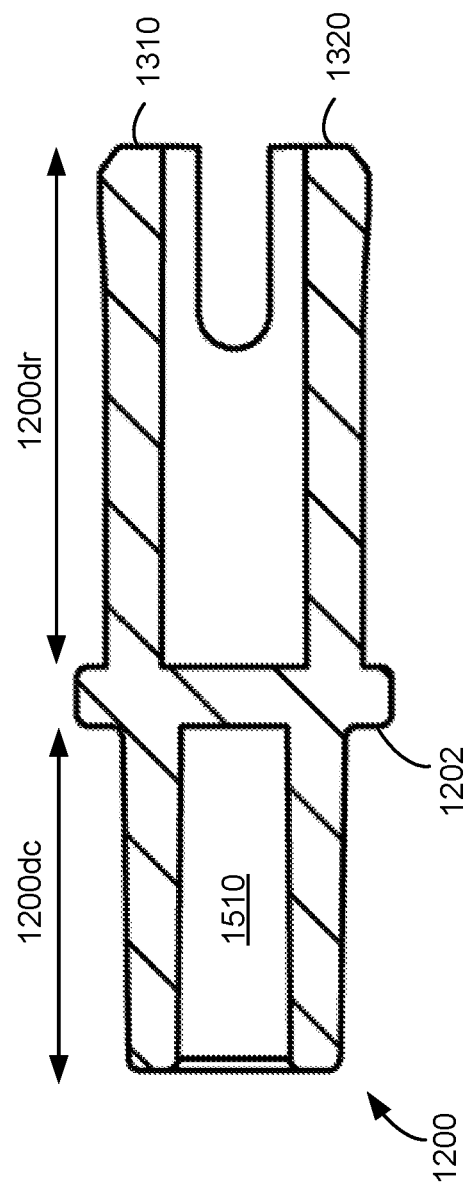
FIG. 17 depicts a cross-sectional view of the adapter 1200 of FIG. 16 along the line 1206, in accordance with various embodiments.

FIG. 17 depicts a cross-sectional view of the adapter 1200 of FIG. 16 along the line 1206, in accordance with various embodiments. The view indicates the bore 1510 1200*dc* and the shape of the opposing legs 1310 and 1320.

FIG. 18A depicts a side view of the adapter 1200, where the driver 1200*dr* is partially inserted into the needle assembly 100 of FIG. 12, and the connector 1200*dc* is partially inserted into the bore 1110 of the external driver 1100 of FIG. 11, in accordance with various embodiments.

FIG. 18B depicts a cross-sectional view of the adapter 1200 of FIG. 18A along the line 1800, in accordance with various embodiments.

FIG. 19A depicts a side view of the adapter 1200, where the driver 1200*dr* is fully inserted into the needle assembly 100 of FIG. 12, and the connector 1200*dc* is fully inserted into the bore 1110 of the external driver 1100 of FIG. 11, in accordance with various embodiments.

FIG. 19B depicts a cross-sectional view of the adapter 1200 of FIG. 19A along the line 1900, in accordance with various embodiments.

Figure 20:
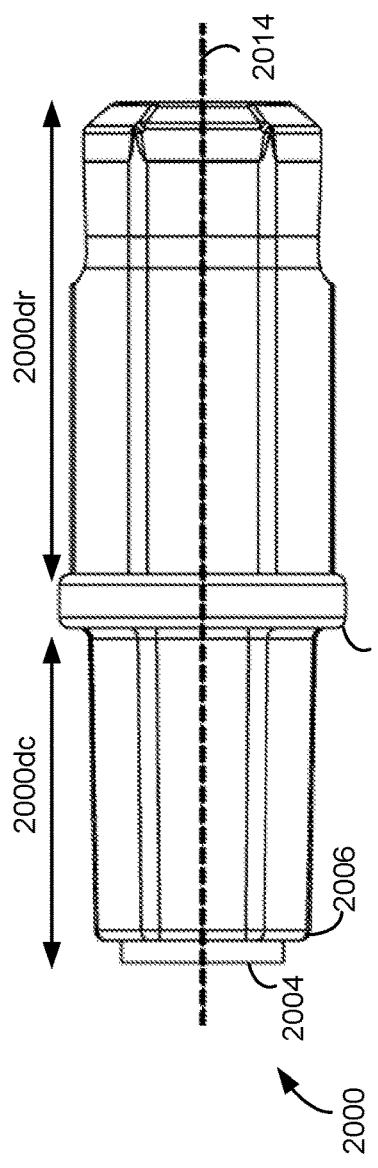
FIG. 20 depicts a cross-sectional view of an adapter 2000, in accordance with various embodiments.
Figure 21:
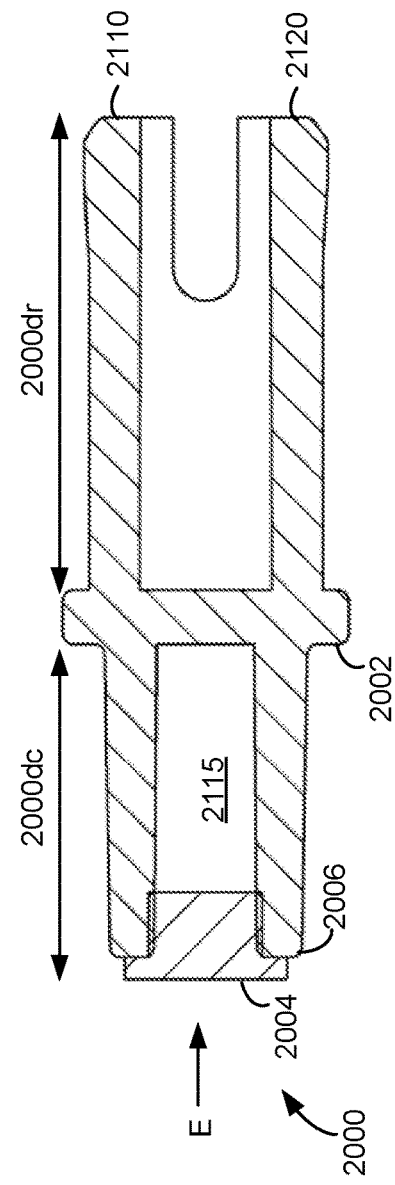
FIG. 21 depicts a cross-sectional view of the adapter 2000 of FIG. 20 along the line 2014, in accordance with various embodiments.

FIG. 20 depicts a cross-sectional view of an adapter 2000, in accordance with various embodiments. A driver 2000*dr*, connector 2000*dc* and flange 2002 are depicted. The driver can be the same as the as the attached driver 130*dr* of FIG. 1, in one implementation. In this case, the driver 2000*dr* includes opposing resilient legs 2110 and 2120 (FIG. 21). Also, in this implementation, the adaptor includes a ferromagnetic metal piece 2004 at the free end 2006 of the driver connector 2000*dc*. The ferromagnetic metal piece is at the free end rather than fully inside the bore so that it can provide a magnetic force when proximate to a magnetized female external driver.

FIG. 21 depicts a cross-sectional view of the adapter 2000 of FIG. 20 along the line 2014, in accordance with various embodiments. The view indicates a bore 2115 within the driver connector 2000*dc*, and the ferromagnetic metal piece 2004 at the free end 2006 of the driver connector 2000*dc*. The opposing resilient legs 2110 and 2120 are also depicted. The ferromagnetic metal piece is insert molded in the bore 2115 in this example.

Figure 22:
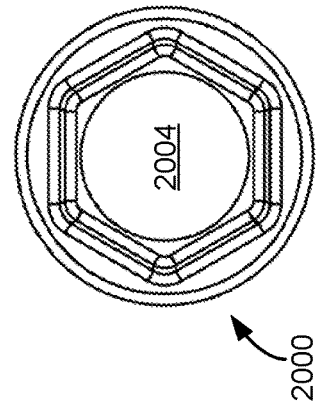
FIG. 22 depicts an end view of the adapter 2000 of FIG. 20 as seen in the direction of the arrow E, in accordance with various embodiments.

FIG. 22 depicts an end view of the adapter 2000 of FIG. 20 as seen in the direction of the arrow E, in accordance with various embodiments. The end view depicts the hexagonal shape of the driver connector 2000*dc* and the ferromagnetic metal piece 2004.

FIG. 23 depicts a cross-sectional view of an adapter 2300, in accordance with various embodiments. A driver 2300*dr*, connector 2300*dc* and flange 2302 are depicted. The driver can be the same as the as the attached driver 130*dr* of FIG. 1, in one implementation. In this case, the driver 2300*dr* includes opposing resilient legs 2410 and 2420 (FIG. 24). Also, in this implementation, the adaptor includes a ferromagnetic metal piece 2304 at the free end 2306 of the driver connector 2300*dc*. The ferromagnetic metal piece is secured in the bore 2415 in an interference fit in this example.

FIG. 24 depicts a cross-sectional view of the adapter 2300 of FIG. 23 along the line 2314, in accordance with various embodiments. The view indicates a bore 2415 within the driver connector 2300*dc*, and the ferromagnetic metal piece 2304 at the free end 2306 of the driver connector 2300*dc*. The opposing resilient legs 2410 and 2420 are also depicted.

FIG. 25 depicts an end view of the adapter 2300 of FIG. 23 as seen in the direction of the arrow F, in accordance with various embodiments. The end view depicts the hexagonal shape of the driver connector 2300*dc* and the ferromagnetic metal piece 2304.

Figure 26:
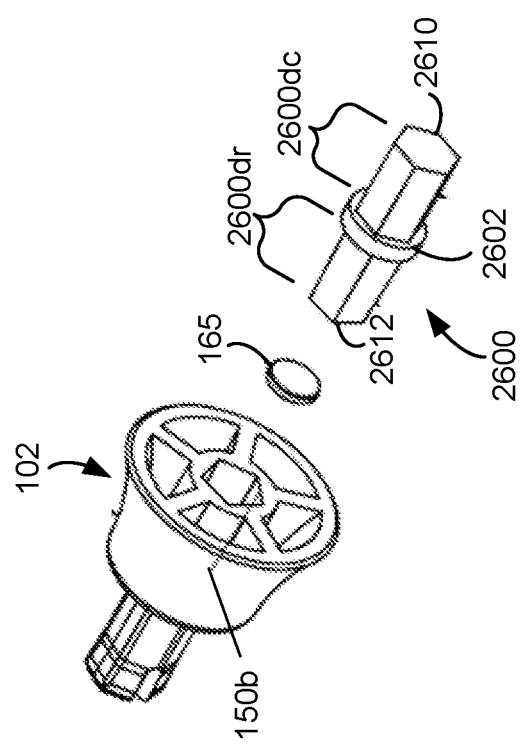
FIG. 26 depicts an isometric view of the adapter 102 with an additional adapter 2600 for coupling the adapter 102 to the female external driver 1100 of FIG. 11, in accordance with various embodiments.

FIG. 26 depicts an isometric view of the adapter 102 with an additional adapter 2600 for coupling the adapter 102 to the female external driver 1100 of FIG. 11, in accordance with various embodiments. The additional adapter 2600 includes a driver 2600*dr* and a driver connector 2600*dc* separated by a flange 2602. The driver 2600*dr* extends from the flange to a free end 2612 and the driver connector 2600*dc* extends from the flange to a free end 2610. The driver 2600*dr* is a male component which fits into the bore 150*b* and the driver connector 2600*dc* is a male component which fits into the bore 1110 of the external driver 1100 of FIG. 11. This approach provides the advantages of the adapter 102 while allowing it to be driven by a female external driver.

The driver 2600*dr* may comprise a polygonal shaft with a magnetic tip and may be tapered or non-tapered. The driver connector 2600*dc* may comprise a polygonal shaft and be tapered or non-tapered.

Figure 27:
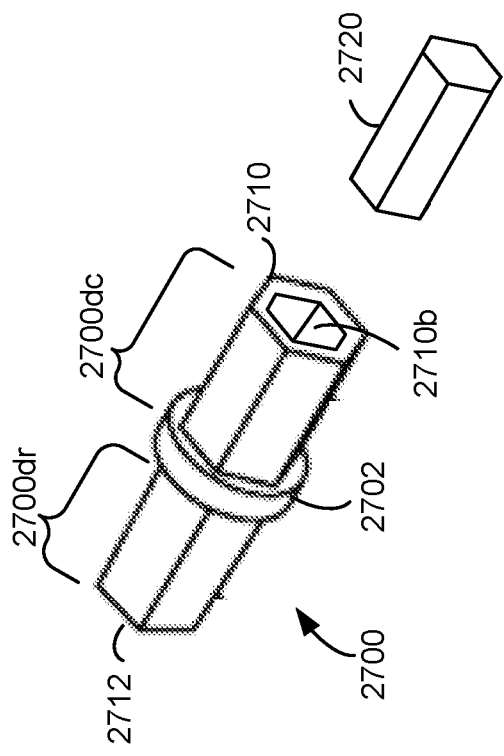
FIG. 27 depicts an isometric view of an additional adapter 2700 for coupling the adapter 102 to a male external driver 2720.

FIG. 27 depicts an isometric view of an additional adapter 2700 for coupling the adapter 102 to a male external driver 2720. The additional adapter 2700 includes a driver 2700*dr* and a driver connector 2700*dc* separated by a flange 2702. The driver 2700*dr* extends from the flange to a free end 2712 and the driver connector 2700*dc* extends from the flange to a free end 2710. The driver connector 2700*dc* includes a bore 2710*b* to receive an external male driver 2720. This approach provides the advantages of the adapter 102 while allowing it to be driven by a male external driver, where the diameter of the driver 2720 and bore 2710*b* is less than a diameter of the driver 2700*dr*.

The driver 2700*dr* may comprise a polygonal shaft with a magnetic tip and may be tapered or non-tapered. The driver connector 2700*dc* may comprise a polygonal bore 2710*b* and be tapered or non-tapered.

Figure 28:
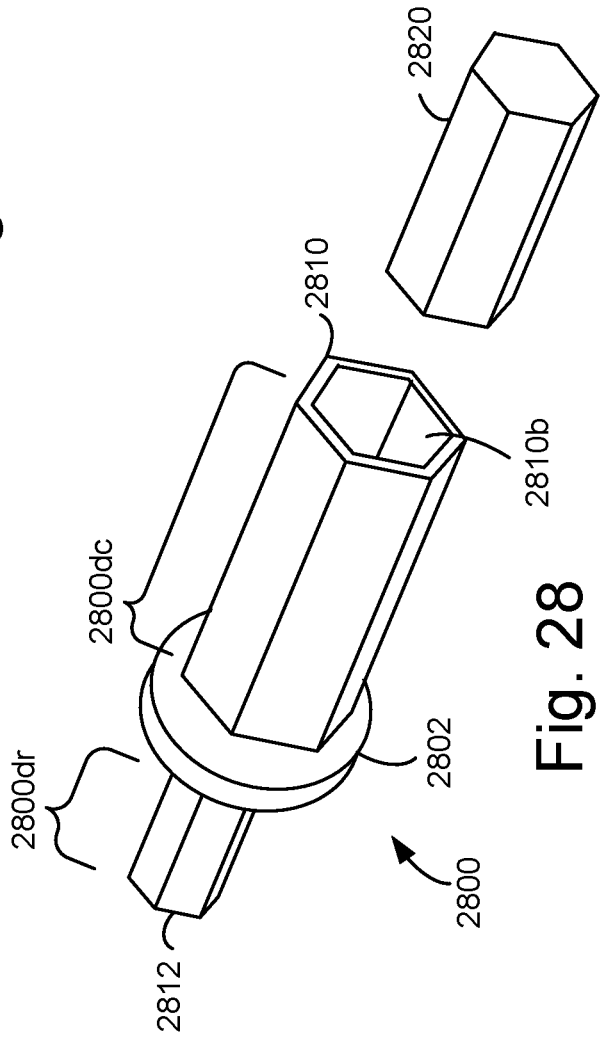
FIG. 28 depicts an isometric view of an additional adapter 2800 for coupling the adapter 102 to a male external driver 2820.

FIG. 28 depicts an isometric view of an additional adapter 2800 for coupling the adapter 102 to a male external driver 2820. The additional adapter 2800 includes a driver 2800*dr* and a driver connector 2800*dc* separated by a flange 2802. The driver 2800*dr* extends from the flange to a free end 2812 and the driver connector 2800*dc* extends from the flange to a free end 2810. The driver connector 2800*dc* includes a bore 2810*b* to receive an external male driver 2820. This approach provides the advantages of the adapter 102 while allowing it to be driven by a male external driver, where the diameter of the driver 2820 and bore 2810*b* is greater than a diameter of the driver 2800*dr*.

The driver 2800*dr* may comprise a polygonal shaft with a magnetic tip and may be tapered or non-tapered. The driver connector 2800*dc* may comprise a polygonal bore 2810*b* and be tapered or non-tapered.

Some non-limiting examples of various embodiments are presented below.

Example 1 includes an adapter, comprising: a driver connector having a front end, a back end and a bore wall, wherein the bore wall extends circumferentially about a longitudinal axis of the adapter from the front end of the driver connector to an end wall of the driver connector, and the bore wall forms a bore having a polygonal cross-section all; and a driver, the driver extending along the longitudinal axis of the adapter from a base, which is coupled to the back end of the driver connector, to a free end, wherein the driver has a polygonal cross-section which is different than the polygonal cross-section of the bore, and comprises a shaft extending from the base and resilient legs extending from the shaft to the free end of the driver.

Example 2 includes the adapter of Example 1, wherein a number of sides in the polygonal cross-section of the bore of the driver connector is different than a number of sides in the polygonal cross-section of the driver.

Example 3 includes the adapter of Example 1 or 2, wherein outer walls of the resilient legs are sloped outward, away from the longitudinal axis.

Example 4 includes the adapter of any one of Examples 1-3, wherein the resilient legs comprise opposing legs separated by a groove to allow an inward movement of the opposing legs when the opposing legs are inserted into bore of a tool to be driven by the adapter.

Example 5 includes the adapter of any one of Examples 1-4, wherein the resilient legs comprise a beveled edge at the free end of the driver to facilitate insertion of the resilient legs into a bore of tool to be driven by the driver.

Example 6 includes the adapter of any one of Examples 1-5, wherein the resilient legs comprise outwardly facing protuberances to hold the driver in a bore of a tool to be driven by the adapter.

Example 7 includes the adapter of any one of Examples 1-6, wherein the resilient legs are to hold the driver in a bore of a tool to be driven by the adapter with a friction fit.

Example 8 includes the adapter of any one of Examples 1-7, wherein: the driver connector comprises an outer wall which extends circumferentially about the bore wall from the front end of the driver connector to the back end of the driver connector, and ribs extending radially from the bore wall to the outer wall; and the ribs, the outer wall and the bore wall are coplanar at the front end of the driver connector.

Example 9 includes the adapter of any one of Examples 1-8, wherein the back end of the driver connector is to abut an end surface of a tool to be driven by the adapter when the driver is inserted into a bore of a tool to be driven by the adapter, to stabilize the adapter relative to the tool to be driven.

Example 10 includes the adapter of any one of Examples 1-9, wherein the bore of the driver connector comprises a region with a stepped-up diameter adjacent to the end wall.

Example 11 includes the adapter of Example 10, further comprising a ferromagnetic metal piece retained in the region of the bore with the stepped-up diameter in an interference fit.

Example 12 includes an adapter, comprising: a driver connector comprising a bore extending along a longitudinal axis of the adapter, the bore having a polygonal cross-section; and a driver coupled to the driver connector, the driver extending along the longitudinal axis of the adapter from the driver connector to a free end of the driver, wherein the driver has a polygonal cross-section and comprises opposing resilient legs extending to the free end of the driver.

Example 13 includes the adapter of Example 12, wherein the driver comprises a shaft extending from the driver connector to the opposing resilient legs.

Example 14 includes the adapter of Example 12 or 13, wherein outer walls of the opposing resilient legs are sloped outward, away from the longitudinal axis, in a direction moving toward the free end.

Example 15 includes the adapter of any one of Examples 12-14, wherein the opposing resilient legs are separated by a groove to allow an inward movement of the opposing resilient legs when the opposing resilient legs are inserted into a bore of a tool to be driven by the adapter.

Example 16 includes the adapter of Example 15, wherein the tool to be driven by the adapter comprises an intraosseous needle assembly.

Example 17 includes the adapter of any one of Examples 12-16, wherein the opposing resilient legs comprise outwardly facing protuberances to hold the driver in a bore of a tool to be driven by the adapter.

Example 18 includes the adapter of Example 17, wherein when the opposing resilient legs are inserted into a bore of a tool to be driven by the adapter, the outwardly facing protuberances are to engage a surface of the tool to be driven by the adapter.

Example 19 includes an adapter, comprising: a driver connector comprising a bore, wherein the bore is to receive an external driver of an external driving tool via a front end of the bore of the driver connector, the driver connector is to receive a rotational force from the external driver about a central longitudinal axis of the adapter, and a diameter of the bore of the driver connector decreases in a direction moving from the front end to a back end of the driver connector; and a driver attached to the driver connector, the attached driver extending along the central longitudinal axis of the adapter from the driver connector, wherein the attached driver is to exert a rotational force on a driven tool about the central longitudinal axis of the adapter when the attached driver is inserted into a bore of the driven tool, and a diameter of the bore of the driven tool is fixed.

Example 20 includes the adapter of Example 19, wherein: the bore of the driver connector has a polygonal cross-section; the attached driver has a polygonal cross-section; and a number of sides in the polygonal cross-section of the bore of the driver connector is different than a number of sides in the polygonal cross-section of the attached driver.

Example 21 includes the adapter of Example 19 or 20, wherein the attached driver comprises opposing resilient legs separated by a groove to allow movement of the opposing resilient legs toward one another when the opposing resilient legs are inserted into the bore of the driven tool.

Example 22 includes the adapter of Example 21, wherein a length of the opposing resilient legs is 20-70% of a length of the attached driver.

Example 23 includes the adapter of Example 21 or 22, wherein the opposing resilient legs comprise outwardly facing protuberances to hold the attached driver in the bore of the driven tool.

Example 24 includes the adapter of any one of Examples 21-23, further comprising a ferromagnetic metal piece at a free end of the driver connector in an interference fit or insert molded.

In another Example, an adapter comprises: a driver connector; a driver; and a flange between the driver connector and the driver, wherein: the driver connector extends along a longitudinal axis of the adapter from the flange to a respective free end and has a polygonal cross section; the driver extends along the longitudinal axis of the adapter from the flange to a respective free end; and the driver has a polygonal cross-section and comprises a shaft extending from the flange and resilient legs extending from the shaft to the free end of the driver.

A further Example includes the previous Example where the resilient legs comprise opposing legs separated by a groove to allow an inward movement of the opposing legs when the opposing legs are inserted into bore of a tool to be driven by the adapter.

A further Example includes any of the previous two Examples where the resilient legs comprise outwardly facing protuberances to hold the driver in a bore of a tool to be driven by the adapter.

The terms "substantially," "close," "approximately," "near," and "about," generally refer to being within +/−10% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled" may mean two or more elements are in direct physical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Where specific details are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An adapter, comprising:
   a driver connector having a front end, a back end and a bore wall, wherein the bore wall extends circumferentially about a longitudinal axis of the adapter from the front end of the driver connector to an end wall of the driver connector, and the bore wall forms a bore having a polygonal cross-section all; and
   a driver, the driver extending along the longitudinal axis of the adapter from a base, which is coupled to the back end of the driver connector, to a free end, wherein the driver has a polygonal cross-section which is different than the polygonal cross-section of the bore, and comprises a shaft extending from the base and resilient legs extending from the shaft to the free end of the driver.

2. The adapter of claim 1, wherein a number of sides in the polygonal cross-section of the bore of the driver connector is different than a number of sides in the polygonal cross-section of the driver.

3. The adapter of claim 1, wherein outer walls of the resilient legs are sloped outward, away from the longitudinal axis.

4. The adapter of claim 1, wherein the resilient legs comprise opposing legs separated by a groove to allow an inward movement of the opposing legs when the opposing legs are inserted into bore of a tool to be driven by the adapter.

5. The adapter of claim 1, wherein the resilient legs comprise a beveled edge at the free end of the driver to facilitate insertion of the resilient legs into a bore of tool to be driven by the driver.

6. The adapter of claim 1, wherein the resilient legs comprise outwardly facing protuberances to hold the driver in a bore of a tool to be driven by the adapter.

7. The adapter of claim 1, wherein the resilient legs are to hold the driver in a bore of a tool to be driven by the adapter with a friction fit.

8. The adapter of claim 1, wherein:
   the driver connector comprises an outer wall which extends circumferentially about the bore wall from the front end of the driver connector to the back end of the driver connector, and ribs extending radially from the bore wall to the outer wall; and the ribs, the outer wall and the bore wall are coplanar at the front end of the driver connector.

9. The adapter of claim 1, wherein the back end of the driver connector is to abut an end surface of a tool to be driven by the adapter when the driver is inserted into a bore of a tool to be driven by the adapter, to stabilize the adapter relative to the tool to be driven.

10. The adapter of claim 1, wherein the bore of the driver connector comprises a region with a stepped-up diameter adjacent to the end wall, and a ferromagnetic metal piece is retained in the region of the bore with the stepped-up diameter in an interference fit.

11. An adapter, comprising:
a driver connector comprising a bore extending along a longitudinal axis of the adapter, the bore having a polygonal cross-section; and
a driver coupled to the driver connector, the driver extending along the longitudinal axis of the adapter from the driver connector to a free end of the driver, wherein the driver has a polygonal cross-section and comprises opposing resilient legs extending to the free end of the driver.

12. The adapter of claim 11, wherein the driver comprises a shaft extending from the driver connector to the opposing resilient legs.

13. The adapter of claim 11, wherein outer walls of the opposing resilient legs are sloped outward, away from the longitudinal axis, in a direction moving toward the free end.

14. The adapter of claim 11, wherein the opposing resilient legs are separated by a groove to allow an inward movement of the opposing resilient legs when the opposing resilient legs are inserted into a bore of a tool to be driven by the adapter.

15. The adapter of claim 14, wherein the tool to be driven by the adapter comprises an intraosseous needle assembly.

16. The adapter of claim 11, wherein the opposing resilient legs comprise outwardly facing protuberances to hold the driver in a bore of a tool to be driven by the adapter, and when the opposing resilient legs are inserted into a bore of a tool to be driven by the adapter, the outwardly facing protuberances are to engage a surface of the tool to be driven by the adapter.

17. An adapter, comprising:
a driver connector comprising a bore, wherein the bore is to receive an external driver of an external driving tool via a front end of the bore of the driver connector, the driver connector is to receive a rotational force from the external driver about a central longitudinal axis of the adapter, and a diameter of the bore of the driver connector decreases in a direction moving from the front end to a back end of the driver connector; and
a driver attached to the driver connector, the attached driver extending along the central longitudinal axis of the adapter from the driver connector, wherein the attached driver is to exert a rotational force on a driven tool about the central longitudinal axis of the adapter when the attached driver is inserted into a bore of the driven tool, and a diameter of the bore of the driven tool is fixed.

18. The adapter of claim 17, wherein:
the bore of the driver connector has a polygonal cross-section;
the attached driver has a polygonal cross-section; and
a number of sides in the polygonal cross-section of the bore of the driver connector is different than a number of sides in the polygonal cross-section of the attached driver.

19. The adapter of claim 17, wherein the attached driver comprises opposing resilient legs separated by a groove to allow movement of the opposing resilient legs toward one another when the opposing resilient legs are inserted into the bore of the driven tool.

20. The adapter of claim 19, wherein a length of the opposing resilient legs is 20-70% of a length of the attached driver.

21. An adapter, comprising:
a driver connector;
a driver; and
a flange between the driver connector and the driver, wherein:
the driver connector extends along a longitudinal axis of the adapter from the flange to a respective free end and has a polygonal cross section;
the driver extends along the longitudinal axis of the adapter from the flange to a respective free end; and
the driver has a polygonal cross-section and comprises a shaft extending from the flange and resilient legs extending from the shaft to the free end of the driver.

22. The adapter of claim 21, wherein the resilient legs comprise opposing legs separated by a groove to allow an inward movement of the opposing legs when the opposing legs are inserted into bore of a tool to be driven by the adapter.

23. The adapter of claim 21, wherein the resilient legs comprise outwardly facing protuberances to hold the driver in a bore of a tool to be driven by the adapter.

24. The adapter of claim 21, further comprising a ferromagnetic metal piece at a free end of the driver connector in an interference fit or insert molded.

* * * * *